United States Patent [19]

Shallenberger

[11] Patent Number: 4,684,503
[45] Date of Patent: Aug. 4, 1987

[54] RECONSTITUTABLE NUCLEAR REACTOR FUEL ASSEMBLY WITH UNITARY REMOVABLE TOP NOZZLE SUBASSEMBLY

[75] Inventor: John M. Shallenberger, Fox Chapel Boro, Pa.

[73] Assignee: Westinghouse Electric Corp., Pittsburgh, Pa.

[21] Appl. No.: 673,681

[22] Filed: Nov. 20, 1984

Related U.S. Application Data

[63] Continuation-in-part of Ser. No. 457,790, Jan. 13, 1983, abandoned.

[51] Int. Cl.$^4$ .............................................. G21C 3/32
[52] U.S. Cl. ..................................... 376/446; 376/449
[58] Field of Search ................ 376/178, 261, 262, 285, 376/353, 362, 364, 434, 438, 445, 446, 449

[56] References Cited

U.S. PATENT DOCUMENTS

| | | | |
|---|---|---|---|
| 3,671,394 | 6/1972 | Bernath et al. | 376/445 |
| 3,770,583 | 11/1973 | Klumb et al. | 376/449 |
| 3,814,667 | 6/1974 | Klumb et al. | 376/446 |
| 3,828,868 | 8/1974 | Jabsen | 376/446 |
| 3,971,575 | 7/1976 | Lesham et al. | 376/446 |
| 3,992,259 | 11/1976 | Anthony et al. | 376/449 |
| 4,208,248 | 6/1980 | Jabsen | 376/438 |
| 4,219,386 | 8/1980 | Osborne et al. | 376/446 |
| 4,269,661 | 5/1981 | Kmonk et al. | |
| 4,284,475 | 8/1981 | Anthony | 376/446 |
| 4,333,798 | 6/1982 | Anthony | 376/449 |
| 4,366,116 | 12/1982 | Christiansen et al. | 376/446 |
| 4,376,092 | 5/1983 | Kmonk et al. | 376/449 |

*Primary Examiner*—Deborah L. Kyle
*Assistant Examiner*—Richard L. Klein

[57] ABSTRACT

A reconstitutable fuel assembly includes an improved attaching structure which has a plurality of coupling sleeves interfitting the upper hold-down plate, lower adapter plate and a plurality of hold-down springs of the top nozzle of the assembly. The coupling sleeves insert over a plurality of extensions extending upwardly from the main bodies of the guide thimbles. The sleeves rest on annular ledges formed on the bottom portions of the respective extensions. A removable cap is attached to the top portion of each of the thimbles extensions and applied to the upper portion of each of the coupling sleeves to releasably lock the coupling sleeves on the guide thimble extensions. In view that the coupling sleeves are fixed to the adapter plate at their lower portions, the sleeves and hold-down plate, adapter plate and hold-down springs disposed between the plates and encircling individual sleeves can be removed together from the fuel assembly as a unitary subassembly upon removal of the removable caps.

20 Claims, 5 Drawing Figures

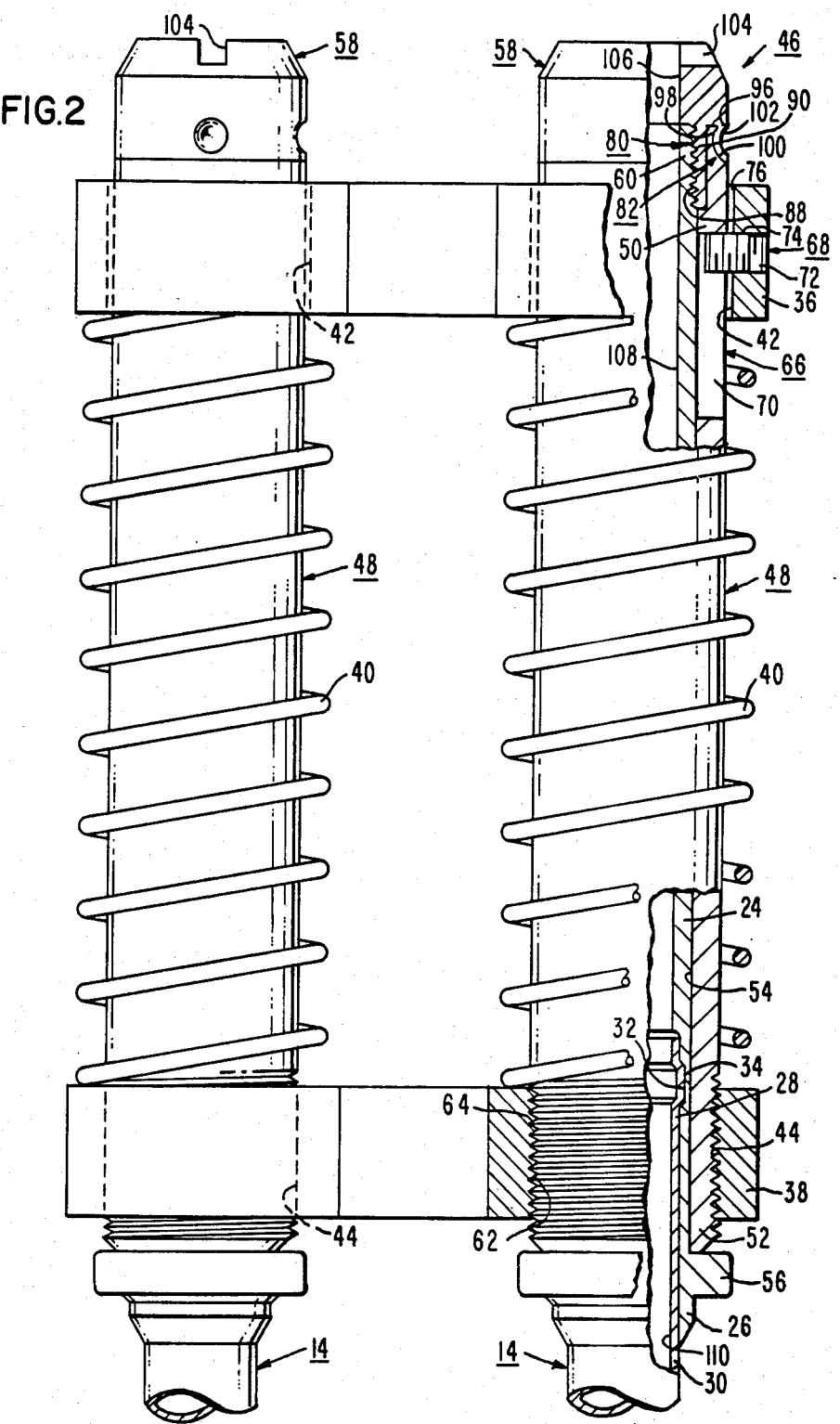

1

RECONSTITUTABLE NUCLEAR REACTOR FUEL ASSEMBLY WITH UNITARY REMOVABLE TOP NOZZLE SUBASSEMBLY

CROSS REFERENCE TO RELATED APPLICATION

This application is a continuation-in-part of copending U.S. patent application Ser. No. 457,790, filed Jan. 13, 1983, now abandoned.

BACKGROUND OF THE INVENTION

1. Field of the Invention

The present invention relates generally to fuel assemblies for nuclear reactors and, more particularly, is directed to an improved attaching structure for removably mounting the top nozzle as a unitary subassembly on the guide thimbles of a reconstitutable fuel assembly.

2. Description of the Prior Art

Conventional designs of fuel assemblies include a multiplicity of fuel rods and control rod guide thimbles held in an organized array by grids spaced along the fuel assembly length. The grids are attached to the control rod guide thimbles. Top and bottom nozzles on opposite ends thereof are secured to the control rod guide thimbles which extend above and below the ends of the fuel rods. At the top end of the assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in the Klumb et al patents (U.S. Pat. Nos. 3,770,583 or 3,814,667).

During operation of such assembly in a nuclear reactor, the fuel rods may occasionally develop cracks along their length resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of an integral assembly of guide thimbles welded to the top and bottom nozzles, it is difficult to detect and remove the failed rods. To gain access to these rods, it is necessary to remove the affected assembly from the nuclear reactor core and then break the welds which secure the nozzles to the control rod guide thimbles. In so doing, the destructive action often renders the fuel assembly unfit for further use in a reactor because of the damage done to both the guide thimbles and the nozzles which prohibit rewelding.

In view of the high costs associated with replacing fuel assemblies, both domestic and foreign utilities have indicated an interest in reconstitutable fuel assemblies in order to minimize their operating and maintenance expenses.

Conventional reconstitutable fuel assemblies incorporate design features arranged to permit the removal of individual failed fuel rods, the option to replace rods, followed by the additional use in the reactor and/or normal handling and storage of the affected fuel assembly. Reconstitution has been made possible by providing a fuel assembly with a removable top nozzle. The top nozzle is mechanically fastened usually by a threaded arrangement to the upper end of each control rod guide thimble assembly, and the top nozzle can be removed remotely from an irradiated fuel assembly while it is still submerged in neutron-absorbing liquid. With rod removal/replacement and after the top nozzle has been remounted on the control rod guide thimbles, the reconstituted assembly can then be reinserted into the reactor and used until the end of its useful life, and/or stored in spent fuel pools or other places in a safe, normal manner.

One type of such reconstitutable fuel assembly can be seen in the aforementioned Klumb et al patents. The fuel assembly of Klumb et al includes a top nozzle which incorporates a hold-down plate and also coil springs coaxially disposed about upwardly extending alignment posts. The alignment posts extend through an upper end plate, spaced below the hold-down plate, and are joined thereto and to the upper ends of the guide thimbles with fastener nuts located on the underside of the upper plate. The upper hold-down plate is slidably mounted on the alignment posts and the coil springs are interposed, in compression, between the hold-down plate and the end plate. A radially enlarged shoulder on the upper end of each of the alignment posts retains the hold-down plate on the posts. In an attempt to improve upon the Klumb et al device, Anthony et al set forth another threaded joint arrangement as seen in U.S. Pat. No. 3,992,259. Yet another type of threaded arrangement used for removably attaching the top nozzle on the control rod guide thimbles can be seen in U.S. Pat. No. 3,828,868 to Jabsen.

These prior art reconstitutable fuel assemblies involve top nozzle arrangements which are difficult to remove and reattach both due to the locations of the fasteners and because removal appears to cause the hold-down device of the nozzle to come apart, requiring added steps and apparatus to prevent this or to later reassemble the hold-down device. Therefore, what has been lacking and is urgently needed is a reconstitutable fuel assembly employing a simple joining or coupling arrangement which allows for easy, remote removal and reattachment of the top nozzle without the possibility of the hold-down device coming apart.

SUMMARY OF THE INVENTION

The present invention provides a reconstitutable fuel assembly having features which establish its top nozzle as a unitary subassembly designed to overcome the problems and shortcomings of, and satisfy the needs left unfulfilled by, the prior art reconstitutable fuel assemblies employing threaded arrangements for the attachment of the top nozzle. Unlike the prior arrangements, the present invention provides attaching structure which adapts the top nozzle to be removable and then replaceable as a unitary subassembly on the guide thimbles. Instrumental in maintaining the subassembly as a unit is the use of at least one and preferably a plurality of coupling members in cooperation with the springs of the hold-down device of the top nozzle to capture and retain the hold-down plate and adapter plate together with the coupling members and springs in a subassembly form. Furthermore, the items—caps—which are used to lock the top nozzle subassembly on the guide thimbles and then first removed to initiate the removal of the top nozzle subassembly are relatively simple, inexpensive components. Thus, new ones can be used at each reconstitution when the top nozzle is removed and reattached. The removable caps are also more accessible for remote manipulation than the fasteners used in prior art arrangements and thus provide an easier and faster means for initiating the removal process.

Accordingly, the present invention sets forth in a reconstitutable fuel assembly having at least one control rod guide thimble and a top nozzle, an improved attaching structure for removably mounting the top nozzle as a unitary subassembly on the guide thimble of the fuel assembly. The guide thimble includes an upper end portion, while the top nozzle includes at least one hold-down spring, an upper hold-down plate and a lower adapter plate. The improved attaching structure comprises: (a) a coupling member interfitting the lower adapter plate, the upper hold-down plate and the hold-down spring disposed between the plates so as to capture and retain the plates and spring together as a unitary subassembly in which the upper plate is slidably movable along the coupling member relative to the lower plate with the spring biasing the upper plate away from the lower plate, the coupling member having spaced apart upper and lower portions with a central passageway extending therebetween for receiving the upper end portion of the guide thimble therein to removably mount the coupling member on the same; (b) means on the upper end portion of the guide thimble supporting the coupling member at its lower portion; and (c) a detachable member releasably applied to the upper portion of the coupling member and disengagably engaged with the upper end portion of the guide thimble so as to removably lock the coupling member to the guide thimble upper end portion, whereby upon removal of the detachable member, the coupling member and the upper hold-down plate, the hold-down spring and the lower adapter plate retained thereon can be removed therewith as a unitary subassembly from the upper end portion of the guide thimble.

More particularly, the supporting means on the upper end portion of the guide thimble is in the form of an outwardly projecting ledge. Further, the upper portion of the coupling member and the upper hold-down plate include respective first and second overlapping means which limit movement of the upper hold-down plate away from the lower adapter plate. Two alternative forms of the first and second overlapping means are disclosed. In the first form, the first and second overlapping means are respectively a recessed slot formed in the coupling member and a pin connected to the hold-down plate which projects into the slot. In the second form, the first and second overlapping means are respectively an outwardly projecting shoulder formed on the coupling member and an upper marginal edge of the hold-down plate which underlies the shoulder. Still further, the detachable member and the upper end portion of the guide thimble include first and second matable means for disengagably engaging the detachable member with the upper end portion, whereas the detachable member and the upper portion of the coupling member include first and second interfering means for releasably attaching the detachable member to the coupling member.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged fragmentary side elevational view of the top nozzle area of the fuel assembly of FIG. 1, with portions cut away, showing a preferred embodiment of the attaching structure of the present invention.

DETAILED DESCRIPTION OF THE INVENTION

Figure 1:
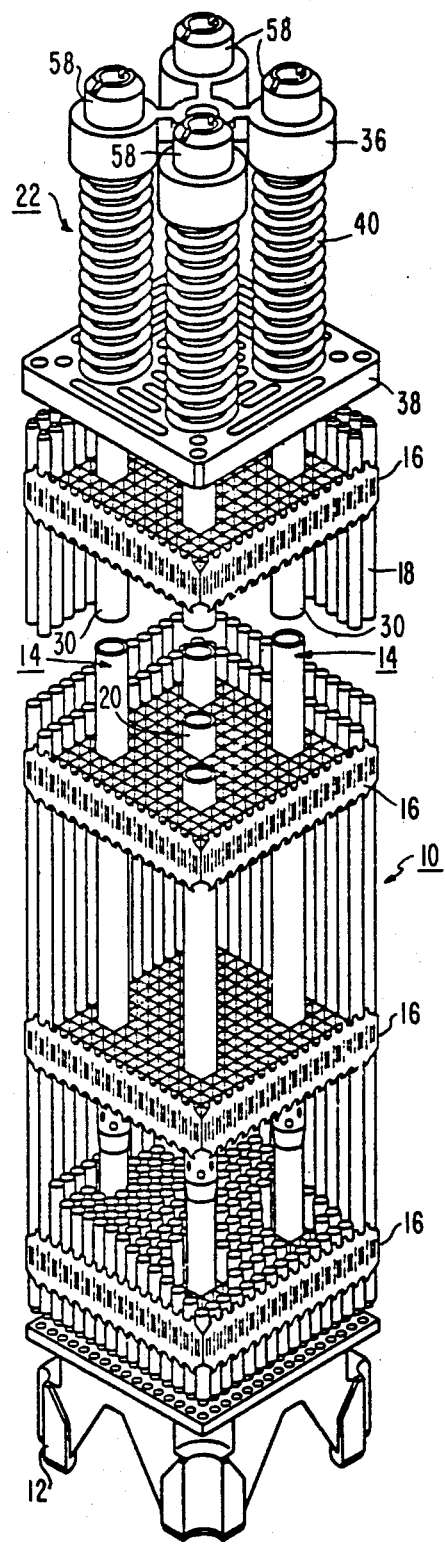
FIG. 1 is a perspective view of a reconstitutable nuclear reactor fuel assembly, with portions of its guide thimbles and fuel rods cut away, which incorporates the improved attaching structure of the present invention for removably mounting the top nozzle of the fuel assembly as a unitary subassembly to the guide thimbles.

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown a perspective view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper end of the guide thimbles 14 in accordance with the present invention which will be fully described below. With such an arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets (not shown) and is closed at its opposite ends by upper and lower end plugs (not shown). The fuel pellets composed of fissile material are responsible for creating the reactive power of the reactor. A liquid moderator/coolant such as water, or water containing boron, is pumped upwardly through the guide thimbles 14 and along the fuel rods 18 of the fuel assembly in order to extract heat generated therein for the production of useful work.

To control the fission process, a number of control rods (not shown) are reciprocally movable in the guide thimbles 14 located at predetermined positions in the fuel assembly 10. Since the control rods are inserted into the guide thimbles 14 from the top of the fuel assembly 10, the placement of the components forming the top nozzle 22 and their attachment to the guide thimbles 14 must accommodate the movement of the control rods into the guide thimbles 14 from above the top nozzle 22.

For mounting the top nozzle 22, each of the guide thimbles 14 has an upper end portion in the form of a separate tubular extension 24. The guide thimble extension 24 is attached at its bottom portion 26 to the upper end 28 of the main guide thimble body 30 by a circumferential bulge fit wherein the bottom portion 26 has a coaxial, inside circumferential groove 32 and the upper end 28 has a coaxial, outside circumferential ridge 34 bulge-fitted in the groove 32. The reason for using the separate guide thimble extension 24, instead of a longer guide thimble body 30, is that just the extension 24 needs to be replaced and not the entire thimble 14 should any problems in threading be encountered during manufacture or use of the extension 24. The guide thimble body 30 would be severed just below the bottom portion 26 of the old extension 24 to remove the damaged extension 24. Then a new longer extension would be attached to the slightly shortened guide thimble body 30 by circumferentially bulging a new groove/ridge set into the interfitted guide thimble body and replacement thimble extension.

Improved Attaching Structure for Removably Mounting the Top Nozzle

The separate components making up the top nozzle 22 which are mounted on the guide thimble extension 24 include an upper hold-down plate 36, a lower adapter plate 38 and a plurality of hold-down springs 40 disposed between the upper and lower plates 36,38. The upper hold-down plate 36 has a plurality of apertures 42 defined therein, while the lower adapter plate 38 has a plurality of openings 44.

As described earlier, to carry out reconstitution of the fuel assembly 10, the top nozzle 22 must first be removed and then, after the fuel rods 18 of the assembly have been inspected and the failed fuel rods removed and replaced, the top nozzle is reattached to the guide thimble extensions 24 of the assembly. In FIG. 1, and in greater detail in FIG. 2, there is seen the preferred embodiment of the improved attaching structure, generally designated 46, for removably mounting the components of the top nozzle 22 as a unitary subassembly on the guide thimble extensions 24. Consequently, the top nozzle 22 does not fall apart each time it is removed from the guide thimbles 14 for reconstitution of the fuel assembly 10.

The improved attaching structure 46 basically includes a plurality of coupling members in the form of a plurality of sleeves 48 which interfit the upper hold-down plate 36, the lower adapter plate 38 and the hold-down springs 40 disposed therebetween in such manner as to capture and retain the plates 36,38 and springs 40 together as a unitary subassembly. Each coupling sleeve 48 has spaced apart upper and lower portions 50,52 with a central passageway 54 extending therebetween for receiving one of the guide thimble extensions 24 therein to removably mount the coupling sleeve 48 on the thimble extension 24. Particularly, means on the bottom portion 26 of the thimble extension 24 in the form of an outwardly projecting annular ledge 56 supports the coupling sleeve 48 at its lower portion 52. Further, the improved attaching structure 46 includes a detachable member in the form of an annular cap 58 releasably applied to the upper portion 50 of the coupling sleeve 48 and disengagably engaged with a top portion 60 of the thimble extension 24 so as to removably lock the coupling sleeve 48 to the guide thimble extension 24.

In such a subassembly, during the period of reactor operation when the fuel assembly 10 is resident in the reactor core, the hold-down plate 36 can slidably move along the coupling sleeves 48 toward the lower adapter plate 38 and against the yieldable biasing of the hold-down springs 40 to accommodate upward lifting of the fuel assembly 10 through a short distance by the pressure of the coolant flowing upwardly along the length of the fuel assembly or by thermal expansion of the guide thimbles 14, while preventing damaging contact of the fuel assembly 10 with an upper core support plate (not shown) secured to the reactor. Then, when reconstitution of the fuel assembly 10 is desired, each of the detachable caps 58 can be conveniently and easily removed from the coupling sleeves 48 and thimble extensions 24, freeing the coupling sleeves 48 from their attachments to the thimble extensions 24. The coupling sleeves 48 and the upper hold-down plate 36, the lower adapter plate 38 and the hold-down springs 40 retained thereon can be removed therewith still as a unitary subassembly from the upper extensions 24 of the guide thimbles 14.

Several features are included in the improved attaching structure 46 which allow the coupling sleeves 48 interfitted with the upper and lower plates 36,38 and the springs 40 to capture and retain them in the unitary subassembly. The first feature has already been mentioned, that being, the annular ledge 56 on the bottom portion 26 of the thimble extension 24 which supports an individual one of the coupling sleeves 48 at its lower portion 52.

A second feature is means in the form of pluralities of first and second complementary threaded sections 62,64 for attaching the lower adapter plate 38 in a fixed positional relationship to each of the coupling sleeves 48. Each of the first threaded sections 62 in the adapter plate 38 actually defines one of the openings 44 in the adapter plate 38, while each of the second threaded sections 64 on the coupling sleeves 48 are defined about the lower portions 52 thereof. Both the thimble extensions 24 and the coupling sleeves 48 which slidably fit over, and seat on the ledge 56 of, the thimble extensions 24 extend together through the openings 44 in the adapter plate 38. However, while the thimble extensions 24 are not attached to the lower adapter plate 38, the coupling sleeves 48 are so attached via their second annular threaded sections 64 which are threaded into the respective first annular threaded sections 62 of the adapter plate 38.

A third feature of the improved attaching structure 46 takes the form of pluralities of first and second overlapping means 66,68 which define upper stops which limit the upward travel of the upper hold-down plate 36 away from the adapter plate 38 due to the bias provided by the compressed hold-down springs 40 encircling the coupling sleeves 48 and positioned between the upper and lower plates 36,38.

Two alternative forms of the first and second overlapping means 66,68 are illustrated in the drawings. In the first form depicted in FIGS. 2 and 3, the first and second overlapping means 66,68 are each respectively a recessed slot 70 formed in the coupling sleeve 48 and a pin 72 threadably connected in an internally threaded hole 74 formed in an inner annular edge 76 which defines one of the apertures 42 in the hold-down plate 36 and surrounds the coupling sleeve 48. It is readily apparent that more than one slot 70 and pin 72 may be used. In the second form depicted in FIG. 4, the first and second overlapping means 66,68 are each respectively an outwardly projecting annular shoulder 78 formed on the upper portion 50' of the coupling sleeve 48' and the inner annular, aperture-defining, edge 76 in the hold-down plate 36.

Finally, a fourth feature of the improved attaching structure 46 relates to first and second matable means 80,82 for disengagably engaging each detachable cap 58 to the top portion 60 of one of the thimble extensions 24, and first and second interfering means 84,86 for releasably attaching each detachable cap 58 to the upper portion 50 of one of the coupling sleeves 48. The annular cap 58 in being engaged and attached respectively to the guide thimble extension 24 and the coupling sleeve 48 provides a connecting bridge therebetween which removably locks them together at the upper portion 50 of the coupling sleeve 48 and the top portion 60 of the thimble extension 24.

Figure 3:
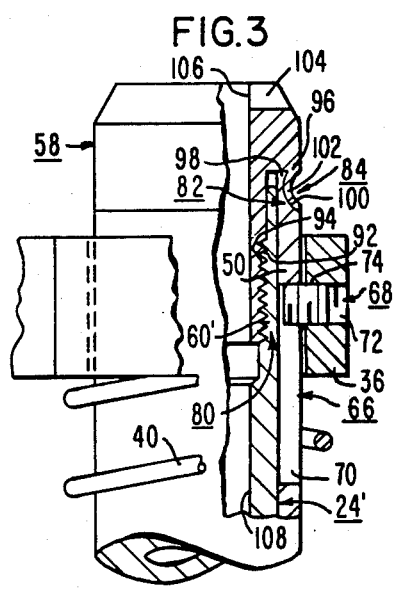
FIG. 3 is a fragmentary side elevational view, with portions cut away, of the upper area of an alternative embodiment to that of the top nozzle attaching structure shown in FIG. 2.
Figure 5:
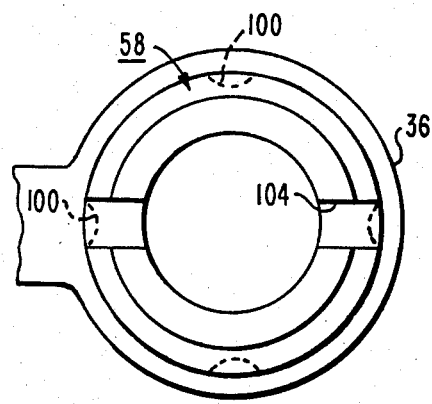
FIG. 5 is a top plan view of the alternative attaching structure of FIG. 4.
Figure 4:
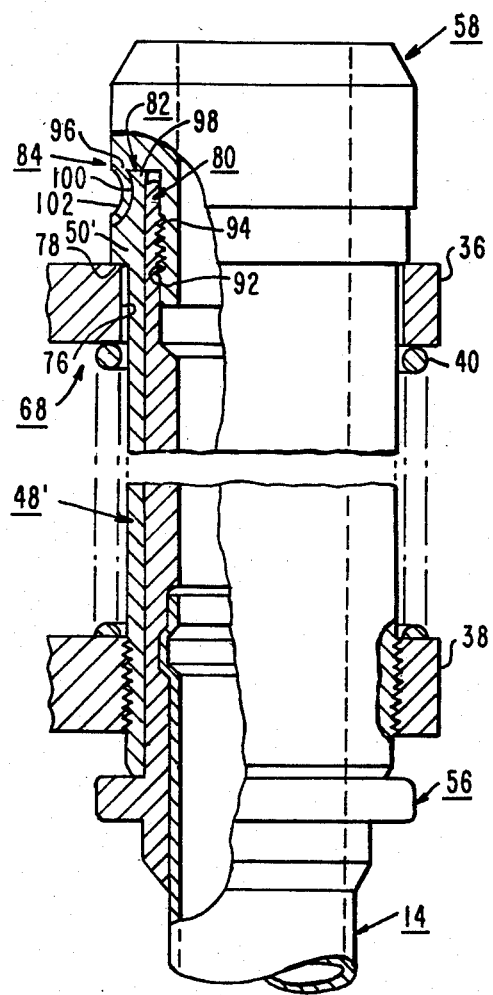
FIG. 4 is an enlarged fragmentary side elevational view of the top nozzle area, with portions cut away, showing another alternative embodiment of the attaching structure to that of FIG. 2.

A slightly different arrangement of the matable means 80,82 is shown in FIG. 2 as compared to the arrangement shown in FIGS. 3 and 4. On the one hand, in FIG. 2 the first matable means 80 is an internally threaded section 88 on the cap 58 and the second matable means 82 is an externally threaded section 90 on the top portion 60 of the guide thimble extension 24. On the other hand, in FIGS. 3 and 4 the first matable means 80 is an externally threaded section 92 on the cap 58 and the second matable means 82 is an internally threaded section 94 on the top portion 60' of the guide thimble extension 24'.

The form of the interfering means 82,84 is the same for the detachable cap 58 in each of the three alternatives of the attaching structure 46. The cap 58 has an outer rim 96 which fits over the edge 98 of the corresponding upper portions 50,50' of the respective coupling sleeves 48,48' so as to overlie a series of dimples 100 formed therein. After the cap 58 is threadably engaged with the respective thimble extensions 24,24', the areas of the rim 96 opposite the dimples 100 are deformed by a suitable tool into complementary dimples 102 which extend into the dimples 100. The locking connection provided by the dimples 100,102 can be overridden by forcibly counter-rotating the cap 58, such as by use of a screwdriver type tool employed in a slit 104 in the top of the cap 58. Also, the cap 58 has a central bore 106 which communicates with the bores 108,110 of the thimble extension 24 and the guide thimble body 30 so that a control rod (not shown) can slidably enter the bores 106,108, 110 from above.

To reconstitute the fuel assembly 10, the cap 58 is counter-rotated to overcome the dimple locking mechanism. With the cap 58 removed, the top nozzle 22 is simply lifted free of the rest of the fuel assembly 10 without disturbing the hold-down device (hold-down plate 36, adapter plate 38, and hold-down springs 40). When reassembly of the top nozzle 22 to the fuel assembly 10 is required, the top nozzle 22 is lowered with the coupling sleeve 48 sliding down over the guide thimble extension 24 and stopping against the ledge 56. The cap 58 is threaded to the guide thimble extension 24 which secures the top nozzle coupling sleeve 48. Then, one or more unused areas of the cap's rim 96 are deformed into underlying dimples 100 to lock the cap 58 against rotating loose. The procedures are performed remotely, usually under many feet of radiation-shielding water.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a reconstitutable fuel assembly having at least one control rod guide thimble and a top nozzle, said guide thimble including an upper extension, said top nozzle including at least one hold-down spring, an upper hold-down plate and a lower adapter plate, an improved attaching structure removably mounting said top nozzle as a unitary subassembly on said guide thimble, said attaching structure comprising:

(a) a coupling member interfitting said lower adapter plate, said upper hold-down plate and said hold-down spring disposed between said plates so as to capture and retain said plates and spring together as a unitary subassembly in which said upper plate is slidably movable along said coupling member relative to said lower plate with said spring biasing said upper plate away from said lower plate, said coupling member having spaced apart upper and lower portions with a central passageway extending therebetween for slidably receiving said upper extension of said guide thimble therein in a nonattached relationship in which said coupling member is slidably movable relative to said guide thimble extension for respectively inserting and removing said coupling member on and from said guide thimble extension;

(b) means on said upper extension of said guide thimble supporting said coupling member at its lower portion so as to limit downward movement of said coupling member relative to said guide thimble extension and thereby insertion of said coupling member thereon without limiting upward movement of said coupling member relative to said guide thimble extension and thereby removal of said coupling member therefrom; and (c) a detachable member releasably applied to said upper portion of said coupling member and disengagably engaged with said upper extension of said guide thimble so as to removably lock said coupling member to said guide thimble extension such that removal of said detachable member from both said coupling member and said guide thimble extension is required before said coupling member and said upper hold-down plate, said hold-down spring and said lower adapter plate retained thereon can be removed therewith as a unitary subassembly from said upper extension of said guide thimble.

2. The improved attaching structure as recited in claim 1, wherein said lower adapter plate and said lower portion of said coupling member include first and second complementary means for attaching said lower adapter plate in a fixed positional relationship to said coupling member.

3. The improved attaching structure as recited in claim 1, wherein said supporting means on said upper end portion of said guide thimble is in the form of an outwardly projecting ledge.

4. The improved attaching structure as recited in claim 1, wherein said upper portion of said coupling member and said upper hold-down plate include respective first and second overlapping means which limit movement of said upper hold-down plate away from said lower adapter plate.

5. The improved attaching structure as recited in claim 4, wherein said first and second overlapping means are respectively in the form of an outwardly projecting shoulder formed on said coupling member and an upper marginal edge of said hold-down plate which underlies said shoulder on said coupling member.

6. The improved attaching structure as recited in claim 4, wherein said first and second overlapping means are respectively in the form of a recessed slot formed in said coupling member and a pin connected to said hold-down plate which projects into said slot in said coupling member.

7. The improved attaching structure as recited in claim 1, wherein said detachable member and said upper end portion of said guide thimble include first and second matable means for disengagably engaging said detachable member with said upper end portion.

8. The improved attaching structure as recited in claim 7, wherein:
said detachable member is an annular cap;
said upper end portion of said guide thimble has a top end; and
said first matable means is an internally threaded section on one of said cap and said guide thimble top end, whereas said second matable means is an externally threaded section on the other of said cap and said guide thimble top end.

9. The improved attaching structure as recited in claim 1, wherein said detachable member and said upper portion of said coupling member include first and second interfering means for releasably attaching said detachable member to said coupling member.

10. The attaching structure as recited in claim 9, wherein said first and second interfering means are in the form of complementary dimples formed in said detachable member and said coupling member.

11. In a reconstitutable fuel assembly having at least one control rod guide thimble and a top nozzle, said guide thimble including an upper extension having spaced apart top and bottom portions, said top nozzle including at least one hold-down spring, an upper hold-down plate with at least one aperture defined therein and a lower adapter plate with at least one opening defined therein, an improved attaching structure for removably mounting said top nozzle as a unitary subassembly on said guide thimble, said attaching structure comprising:
(a) a coupling sleeve disposed through said aperture of said upper hold-down plate and said opening of said lower adapter plate and extending through said hold-down spring so as to space said upper and lower plates apart from each other with said spring therebetween, said coupling sleeve having spaced apart upper and lower portions with a passageway extending therebetween for slidably receiving said guide thimble extension therein in a nonattached relationship in which said coupling sleeve is slidably movable relative to said guide thimble extension for respectively inserting and removing said coupling sleeve on and from said guide thimble extension;
(b) means on said bottom portion of said guide thimble extension supporting said coupling sleeve at its lower portion so as to limit downward movement of said coupling sleeve relative to said guide thimble extension and thereby insertion of said coupling sleeve thereon without limiting upward movement of said coupling sleeve relative to said guide thimble extension and thereby removal of said coupling sleeve therefrom;
(c) means attaching said lower adapter plate in a fixed positional relationship to said coupling sleeve;
(d) means on said upper portion of said coupling sleeve forming an upper stop, said upper hold-down plate being disposed in slidably movable relationship to said coupling sleeve and biased by said hold-down spring toward and into engagement with said upper stop, said upper stop and said attaching means capturing and retaining said plates and spring together on said coupling sleeve as a unitary subassembly; and
(e) a detachable member releasably applied to said upper portion of said coupling sleeve and disengagably engaged with said top portion of said guide thimble extension so as to removably lock said coupling sleeve to said guide thimble extension such that removal of said detachable member from both said coupling sleeve and said guide thimble extension top portion is required before said coupling sleeve and said upper hold-down plate, said hold-down spring and said lower adapter plate retained thereon can be removed therewith as a unitary subassembly from said upper extension of said guide thimble.

12. The improved attaching structure as recited in claim 11, wherein said supporting means on said lower portion of said guide thimble extension is in the form of an outwardly projecting annular ledge.

13. The improved attaching structure as recited in claim 11, wherein said means attaching said lower adapter plate to said coupling sleeve includes first and second annular threaded sections, said first threaded section defining said opening in said lower adapter plate and said second threaded section being defined about said lower portion of said coupling sleeve and threaded into said first section for attaching said lower adapter plate in a fixed positional relationship to said coupling member.

14. The improved attaching structure as recited in claim 11, wherein said upper stop forming means includes first and second overlapping means respectively defined on said upper portion of said coupling sleeve and said upper hold-down plate.

15. The improved attaching structure as recited in claim 14, wherein said first and second overlapping means are respectively in the form of an outwardly projecting annular shoulder formed on said coupling sleeve and an inner annular edge, which defines said aperture in said hold-down plate and surrounds said coupling sleeve, underlying said shoulder on said coupling sleeve.

16. The improved attaching structure as recited in claim 14, wherein said first and second overlapping means are respectively in the form of a recessed slot formed in said coupling sleeve and a pin projecting into said slot in said coupling sleeve, said pin being connected to said hold-down plate at an inner annular edge which defines said aperture in said hold-down plate and surrounds said coupling sleeve.

17. The improved attaching structure as recited in claim 11, wherein said detachable member and said top portion of said guide thimble extension include first and second matable means for disengagably engaging said detachable member with said top portion of said guide thimble extension.

18. The improved attaching structure as recited in claim 17, wherein:
    said detachable member is an annular cap; and
    said first matable means is an internally threaded section on one of said cap and said guide thimble extension top portion, whereas said second matable means is an externally threaded section on the other of said cap and said guide thimble extension top portion.

19. The improved attaching structure as recited in claim 11, wherein said detachable member and said upper portion of said coupling sleeve include first and second interfering means for releasably attaching said detachable member to said coupling sleeve.

20. The attaching structure as recited in claim 19, wherein said first and second interfering means are in the form of complementary dimples formed in said detachable member and said coupling sleeve.

* * * * *